United States Patent [19]

Aratsu

[11] Patent Number: 4,861,174

[45] Date of Patent: Aug. 29, 1989

[54] DEVICE FOR DRIVING PRINT MEMBER OF PRINTER

[75] Inventor: Shuichi Aratsu, Iwate, Japan

[73] Assignee: Alps Electric Co., Ltd., Japan

[21] Appl. No.: 220,918

[22] Filed: Jul. 18, 1988

Related U.S. Application Data

[63] Continuation-in-part of Ser. No. 900,235, Aug. 25, 1986, abandoned, which is a continuation of Ser. No. 653,939, Sep. 24, 1984, abandoned.

[30] Foreign Application Priority Data

Sep. 22, 1983 [JP] Japan .......................... 58-146814[U]

[51] Int. Cl.[4] ........................ B41G 3/00; G01D 15/16

[52] U.S. Cl. .................................. 400/18; 346/139 R

[58] Field of Search .................................... 400/16–22, 400/215, 636; 346/139 R; 74/567, 569

[56] References Cited

U.S. PATENT DOCUMENTS

| | | | |
|---|---|---|---|
| 3,935,813 | 2/1976 | Matsubara | 101/93.31 |
| 4,018,154 | 4/1977 | Matsumoto | 101/93.02 |
| 4,069,724 | 1/1978 | Sobotta | 74/569 |
| 4,405,931 | 9/1983 | Fujisawa | 346/139 R |
| 4,441,109 | 4/1984 | Fujisawa | 400/18 X |

FOREIGN PATENT DOCUMENTS

| | | | |
|---|---|---|---|
| 3140473 | 8/1982 | Fed. Rep. of Germany | 400/636 |
| 59-26267 | 2/1984 | Japan | 400/18 |
| 537851 | 12/1976 | U.S.S.R. | 400/215 |

*Primary Examiner*—David A. Wiecking
*Assistant Examiner*—Moshe I. Cohen
*Attorney, Agent, or Firm*—Guy W. Shoup; Paul J. Winters; Stephen L. Malaska

[57] ABSTRACT

A device for activating the pen of a printer comprises a push member and for pushing the pen toward the platen of the printer, a connecting lever secured to the push member, a driving lever for imparting a driving motion to the push member via the connecting lever. The driving lever is provided with a grooved cam in which the tip of the connecting layer is inserted so as to be slidable along the cam.

6 Claims, 1 Drawing Sheet

DEVICE FOR DRIVING PRINT MEMBER OF PRINTER

This application is a continuation-in-part of Ser. No. 900,235 now abandoned, filed Aug. 25, 1986, which is a continuation of Ser. No. 653,939 now abandoned and filed Sept. 24, 1984.

FIELD OF THE INVENTION

The present invention relates to a printer, such as a printer using a pen, where the print member is pressed against a platen by a push member to produce a printed character and more particularly to a device which can drive the push member with a small quantity of electric power to drive the print member.

BACKGROUND OF THE INVENTION

In a printer using a pen, the pen opposed to a platen is pushed by a push member such as hammer in printing so that the tip of pen is brought into contact with a printing paper on the front face of platen.

And the push member is driven by the rotation of a drive shaft, for example, as shown in commonly owned U.S. Pat. No. 4,405,931, issued to Fugisawa on Sept. 20, 1983. A mechanism is proposed which comprises a lever provided on one end of the drive shaft and a solenoid for pivoting the lever and thus the drive shaft with its attraction.

By this method, however, is consumed a great amount of electric power since current is left supplied so long as the solenoid attracts the lever.

Also, a spring for exerting a force opposite to the direction of attraction is needed to return the solenoid from the attraction state so that electric power necessary for the attraction of solenoid is further increased.

When a self-holding type solenoid is used, current does not need to be supplied while the solenoid attracts. However, current needs to be supplied not only in the attraction, but also at the release from attraction in the reverse direction so that a drive circuit is complicated. Also, in the release of attraction, the self-holding force needs to be overcome so that the maximum current is increased.

Also in the case of solenoid, an operational distance in which the effective attraction is generated is short so that the operational distance should be expanded by any methods.

A pen changing mechanism operated by a change lever is shown in commonly owned Japanese Patent Publication No. 59-26267, and thus is considered to be conventional and will not be described further herein.

SUMMARY OF THE INVENTION

A device for driving a print member according to this invention in a printer comprising the print member to move back and forth opposedly to a platen and a push member provided behind the print member to press the print member toward the platen, is provided with a connecting lever for operating said push member, and said connecting lever is connected to a drive lever connected pivotably to a drive source through a slot cam and a projection connected thereto so that any superfluous loads such as spring load are not applied to the connecting lever and current does not need to be continuously supplied to the drive source in keeping operating the push member.

DETAILED DESCRIPTION OF THE INVENTION

Hereinafter will be described an embodiment according to this invention with reference to FIGS. 1 and 2.

Figure 1:
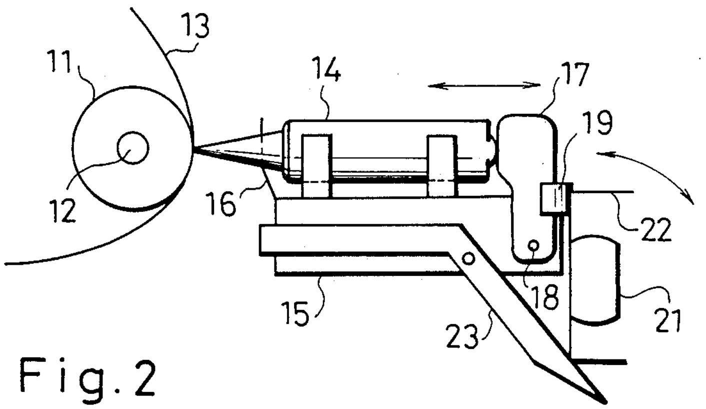
FIG. 1 is a side view showing a pen driving device of a printer of an embodiment according to this invention.

FIG. 1 is a side view showing an example of a pen type printer according to this invention.

Figure 2:
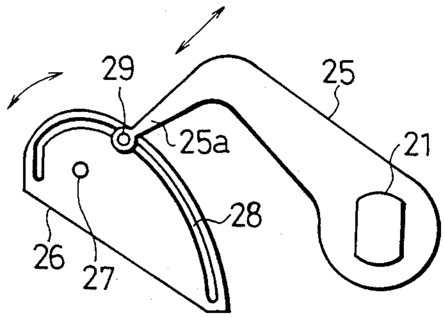
FIG. 2 is a side view showing a drive lever and a connecting lever.

FIG. 2 shows a pen driving device for said printer.

In the drawing, numeral 11 designates a platen and a shaft 12 of the platen is rotatably driven by a stepping motor (not shown) or the like clockwise and counterclockwise.

A printer paper 13 is placed on the front surface of platen 11. This printing paper 13 is sandwiched by the platen 11 and a pinch roller 14 to be fed out vertically as viewed in FIG. 1 by the rotationary operation of platen 11.

A pen 15 as a print member is placed opposedly to the platen 11. This pen 15 is operatively held by a holder 16 to be moved to and away from the platen 11. The holder 16 is provided with a leaf spring 17 so that the pen 15 is urged to retreat from the platen 11 by the elastic force of leaf spring 17.

Further, the holder 16 is mounted on a carriage 18 which is provided to reciprocate in the direction particular to the paper surface of FIG. 1, i.e., axially of the platen. And this carriage 18 is dragged through a wire or belt by power of a stepping motor (not shown) to be driven in the direction perpendicular to said paper surface.

Also, behind the carriage 18 is provided a hammer-shaped push member 19 which is supported on the lower portion by a pin 20 pivotably relative to the carriage 18.

Also, on the rear portion of push member 19 is provided a roller 21 to be rotated about its own axis.

Behind the carriage 18 is provided a drive shaft 22.

This drive shaft 22 extends parallel to the platen 11 to be rotatably supported on both ends by body side plates (not shown) of printer.

This drive shaft 22 has an oblong section, and a drive frame 23 having a U-shaped section is secured fixedly to the flat surface facing the platen 11.

The upper portion of drive frame 23 shown in the drawing bears against the roller 21 on the rear portion of push member 19, and the lower portion of drive frame 23 shown in the drawing bears against a color changing lever 24 which will be later described.

As shown in FIG. 2, a connecting lever 25 is secured fixedly to one end of drive shaft 22.

Near the connecting lever 25 is provided pivotably a shaft 28 of the drive lever 27.

This drive shaft 27 is rotatably driven by a motor (not shown).

Also, the drive lever 27 is provided with a slot cam 29 which may be a recess formed on the surface of drive lever 27 or a slot extending through same.

On the other hand, the connecting lever 25 is provided on the tip with a pin 26 which is inserted into the slot cam 29.

When the slot cam 29 extends through the surface of drive lever 27, a ring of the like for preventing the pin from coming off is attached to the tip of pin 26 from the rear side of drive lever 27 shown in the drawing.

Further, the printer in the embodiment shown in the drawing can select a plurality of colors for printing, and a plurality of pens 15 are received in a cylindrical holder and one of the pens 15 is moved to a print position by pivoting said color changing lever 24 supported pivotably by the carriage 18 to change over colors for printing.

Now will be described the operation of printer thus constituted.

The pen 15 of print member is driven by the operation of drive lever 27, i.e., when the drive lever 27 is pivoted by a motor, the connecting lever 25 is pivoted about the drive shaft by the pin 26 sliding along the slot cam 29.

This pivoting force is transmitted from the drive shaft 22 to the drive frame 23 to pivot the drive frame 23 together.

Referring to FIG. 1, when the drive frame 23 is pivoted counterclockwise, the upper portion of drive frame 23 pushes the roller 21 so that the push member 19 is pivoted counterclockwise about the pin 20.

And this press member 19 pushes the rear end of pen 15 so that the tip of pen 15 is pressed against the printing paper 13 on the front surface of platen 11.

Then, the shape of slot cam 29 is changed such that the drive lever 27 is not rotated even by applying a force from the connecting lever 25 to the drive lever 27 according to the positional relationship between the slot cam 29 formed in the drive lever 27 and the projection 26.

When under such condition the carriage 18 is moved and the platen 11 is rotated to feed out vertically the printing paper 13, characters and patterns will be printed according to the operation of printing paper 13 and pen 15.

Further, when the carriage 18 is moved, the descending roller 21 of push member rolls along the front surface of drive frame 23 to avoid sliding friction.

When the drive frame 23 is pivoted clockwise, the drive frame 23 is pivoted to be moved away from the platen 11 so that the pen 15 is urged by the leaf spring 17 to leave the printing paper and stop the printing.

Further, when the drive frame 23 is largely pivoted clockwise by the pivoting of drive lever 27, the lower portion of drive frame 23 presses and pivots the color changing lever.

And the holder 16 is rotated by the color changing lever 24 to change operatively the color of the pen.

According to the above-mentioned invention, one of the drive lever and connecting lever is provided with the slot cam and the other is provided with the projection for engaging said slot cam and sliding along the slot cam so that superfluous loads are eliminated and further, the drive source can retain the condition of pressing the pen or the like according to the shape of slot cam without generating any forces.

Also, one drive source can carry out a plurality of operations comprising not only the pressing of pen but also the selection of pen.

What is claimed is:

1. In a device for driving a print member of a printer which includes a platen on which a recording sheet is supported, a carriage movable along the platen, at least one print member carried on a moving means supported on the carriage and adapted to be changeably moved to a printing position on the carriage for printing, means including a change lever for actuating the moving means to move a selected print member to the printing position, a push member mounted on the carriage for pushing a print member at the printing position toward the platen in order to print on the recording sheet, and a driving source for providing a driving output for actuating the moving means and the push member, an improved driving device comprising:

a rotatable shaft extending parallel to said platen;

a driven frame fixed to said shaft and having one portion disposed so as to bear against said push member for driving a print member when said shaft is rotated in one direction, and another portion disposed so as to bear against an end of said change lever for actuating said moving means when said shaft is rotated in the other direction;

a rotatable driving lever coupled to said driving source and being rotatable in one or the other direction for rotatably driving said shaft and driven frame in the corresponding directions, said driving lever having a grooved can formed therein; and a connecting lever having one end portion mounted to said shaft and another end portion including a tip slidably engaged in said grooved cam of said driving lever, whereby the driving lever is rotated to drive the print member for printing in one direction and to actuate the change lever in the other direction while a sliding connection between the tip of the connecting lever and the grooved cam of the driving lever is maintained in both directions of rotation, and the need for biasing means for biasing the tip of the connecting lever into pressure contact with the cam of the driving lever is eliminated.

2. A device as set forth in claim 1, wherein the grooved cam is a recess formed in the driving lever.

3. A device as set forth in claim 1, wherein the grooved cam is a hole extending through the driving lever.

4. A device as set forth in claim 1, wherein the print member is a pen.

5. A device as set forth in claim 1, wherein the print member is a thermal printer.

6. A device for driving a print member according to claim 1, wherein said tip has a protrusion inserted in the groove of said cam for sliding movement therealong.

* * * * *

UNITED STATES PATENT AND TRADEMARK OFFICE

CERTIFICATE OF CORRECTION

PATENT NO. : 4,861,174

DATED : August 29, 1989

INVENTOR(S) : Shuichi Aratsu

It is certified that error appears in the above-identified patent and that said Letters Patent is hereby corrected as shown below:

Abstract:

Line 2, after member delete "and"

Line 4, after member, insert --and--

Line 7, delete "layer" and insert --lever--

Signed and Sealed this

Twenty-third Day of October, 1990

*Attest:*

HARRY F. MANBECK, JR.

*Attesting Officer*

*Commissioner of Patents and Trademarks*